(12) United States Patent
Fried et al.

(10) Patent No.: US 6,895,650 B2
(45) Date of Patent: May 24, 2005

(54) PROCESS FOR PRODUCING A SPATIALLY SHAPED CARRIER LAYER

(75) Inventors: Reinhard Fried, Nussbaumen (CH); Alkan Goecmen, Baden-Dättwil (CH)

(73) Assignee: Alstom Technology LTD, Baden (CH)

( * ) Notice: Subject to any disclaimer, the term of this patent is extended or adjusted under 35 U.S.C. 154(b) by 36 days.

(21) Appl. No.: 10/173,258

(22) Filed: Jun. 18, 2002

(65) Prior Publication Data

US 2003/0000675 A1 Jan. 2, 2003

(30) Foreign Application Priority Data

Jun. 28, 2001 (DE) .......................................... 101 31 362

(51) Int. Cl.$^7$ ................................................ B23P 25/00
(52) U.S. Cl. ....................... 29/458; 29/527.1; 29/527.2; 428/593; 428/116; 164/47; 164/422; 427/251
(58) Field of Search ................ 29/458, 527.1, 29/527.2, 527.5, 890; 148/516, 523; 428/593, 938, 116, 118, 937; 164/46, 95, 47, 72, 131, 422, 488; 427/251, 255.5, 451, 456, 585, 124

(56) References Cited

U.S. PATENT DOCUMENTS

| | | | |
|---|---|---|---|
| 2,942,970 A | | 6/1960 | Goetzel et al. |
| 3,196,089 A | | 7/1965 | Stoycos |
| 3,490,116 A | | 1/1970 | Cape |
| 3,926,301 A | | 12/1975 | Brooks |
| 4,275,090 A | * | 6/1981 | McComas et al. .......... 427/451 |
| 4,357,222 A | * | 11/1982 | Lucek .......................... 204/472 |
| 4,418,124 A | | 11/1983 | Jackson et al. |
| 4,447,466 A | | 5/1984 | Jackson et al. |
| 4,532,191 A | * | 7/1985 | Humphries et al. ......... 428/678 |
| 5,577,547 A | * | 11/1996 | Hosamani ................... 164/122 |
| 5,618,633 A | * | 4/1997 | Swanson et al. ............ 428/593 |
| 6,308,765 B1 | * | 10/2001 | Grinberg et al. ............ 164/34 |
| 6,470,954 B2 | * | 10/2002 | Kinane et al. ............... 164/46 |
| 6,485,025 B1 | * | 11/2002 | Hammersley et al. ...... 277/414 |

FOREIGN PATENT DOCUMENTS

| | | |
|---|---|---|
| DE | 692598 | 6/1940 |
| DE | 42 25 779 A1 | 2/1994 |
| DE | 19608719 A1 | 9/1997 |
| DE | 197 30 732 A1 | 1/1999 |
| EP | 0295975 A1 | 12/1988 |
| EP | 0 358 801 A1 | 3/1990 |
| EP | 510950 A1 | 10/1992 |
| EP | 0 897 020 A1 | 2/1999 |
| EP | 1 091 020 A1 | 4/2001 |
| GB | 2007129 A | 5/1979 |
| JP | 63286563 A * | 11/1988 |
| WO | 97/18074 | 5/1997 |
| WO | WO99/39020 | 8/1999 |

OTHER PUBLICATIONS

An 1988 (5): 73105 Compendex.
Search Report from EP 02 40 5373 (Aug. 30, 2004).

* cited by examiner

Primary Examiner—Jermie E. Cozart
(74) Attorney, Agent, or Firm—Cermak & Kenealy, LLP; Adam J. Cermak

(57) ABSTRACT

A process for producing a spatially shaped carrier layer (3) which is of foil-like design from hard brittle material includes:
- providing a basic mold (1) having a spatially shaped surface,
- depositing a material which is in the gas or liquid phase on the spatially shaped surface,
- solidifying the material which has been deposited on the spatially shaped surface to form a hard brittle material layer (3), and
- separating the hard brittle material layer (3) from the spatially shaped surface in order to obtain the carrier layer (3) which consists of hard brittle material.

7 Claims, 4 Drawing Sheets a)

a)

b)

c)

d)

PROCESS FOR PRODUCING A SPATIALLY SHAPED CARRIER LAYER

FIELD OF THE INVENTION

The invention relates to a process for producing a spatially shaped carrier layer which is of foil-like design from hard brittle material.

DISCUSSION OF RELATED ART

Carrier layers of the generic type described above which consist of hard brittle material are playing an increasingly important role in the use of axial-flow turbomachines, for example in gas turbine installations. The further explanations given below relate to the use of the abovementioned carrier layers in gas turbine engineering, but it is not intended that this application area should restrict the technological value nor the versatility of a carrier layer of this type.

The efficiency of an axial-flow turbomachine can be increased, inter alia, by consistent reduction of loss mechanisms which occur within the turbomachine. What are known as leakage flows which occur between the rotor tips and the stator housing which surrounds the rotor arrangement form a significant loss mechanism. Irrespective of whether the axial-flow turbomachine is a compressor or gas turbine, it is particularly important to ensure that the gap space which is present between the rotating blade or vane tips and the stator housing which lies directly opposite the rotating blade or vane tips is set to be as small as possible. In order, on the one hand, to satisfy the above requirement but, on the other hand, to ensure that the rotor arrangement runs freely inside the stator housing, radially outwardly oriented sealing elements are arranged on the turbine blades or vanes, which are generally provided with cover strips, which sealing elements are formed as wearing elements and, after a suitable run-in or wearing time, enclose an optimum gap, which is as narrow as possible, with the stator housing, so that the leakage flows which inevitably occur are reduced to a minimum. Wearing elements of this type have, in a manner which is known per se, what is known as a honeycomb structure, which is produced from thin metal sheets, and are arranged on the outer circumference of the cover strips of turbine blades or vanes.

To produce honeycomb structures of this type, the metal sheets are produced using known methods, such as rolling, drawing, stretching, sizing, etc. With the aid of known machining methods of this type, the metal sheets are cut to the desired length and are shaped into the known zigzag-shaped strips, which, having been suitably stapled together, result in the known honeycomb structures. The stapling or joining of the individual zigzag-shaped strips to form a three-dimensional honeycomb structure is effected with the aid of joining techniques which are known per se, such as soldering or welding.

The materials used for the metal sheets are generally nickel-base, cobalt-base or iron-base alloys which for production have a ductility which is required for deformation. Honeycomb structures of this type, which are formed from the groups of alloys described above, however, have only a limited ability to withstand thermal loads or a limited resistance to oxidation, and consequently they can only be used as sealing elements in a gas turbine for a prolonged period at temperatures of at most 1000° C. However, modern gas turbine installations with optimized efficiency are operated at temperatures which are well above 1000° C., so that the sealing elements made from the materials listed above have an uneconomically short service life and are therefore unusable.

Although material compounds have been disclosed which have a much higher thermal stability and are in widespread use in particular in gas turbine engineering, for example oxidation-resistant MCrAlY materials, which are resistant to oxidation and withstand thermal loads at temperatures of well over 1000° C., metal chromium aluminum yttrium alloys of this type, in which nickel, cobalt or iron can be used as the metals, are extremely brittle, and consequently they cannot be processed using the known shaping processes which have been mentioned in the introduction, such as rolling or drawing, etc.

SUMMARY OF THE INVENTION

Therefore, the object of the invention is to provide a process for producing a spatially shaped carrier layer which is of foil-like design from hard brittle material, preferably MCrAlY materials, which is technically and economically viable. In particular, the carrier layer which is produced using the process in the form of a three-dimensional structure, preferably a honeycomb structure, is to be suitable for use as a sealing element in an axial-flow turbomachine. In this context, it is particularly important for the sealing element produced using the process to have a thermal stability which is such that the sealing element is to withstand temperatures of well over 1000° C., preferably 1200° C., without being damaged.

The solution to the object on which the invention is based is described in claim 1. Claims 3, 4 and 5 give alternative solutions. Preferred uses as a blade or vane sealing element form the subject matter of claims 12 onward.

According to the invention, the process for producing a spatially shaped carrier layer which is of foil-like design from hard brittle material is composed of the following process steps:

First of all, a basic mold having a spatially shaped surface is to be provided, having a surface structure which the carrier layer which is to be produced, consisting of hard brittle material, is ultimately to adopt. In a following step, the hard brittle material, which is in the gas or liquid phase, is deposited on the structured surface of the basic mold by means of suitable deposition techniques. Flame spraying or thermal spraying or air spraying, in which the material to be deposited is initially in powder or granule form, is heated and is deposited on the surface of the basic mold in drop form by means of a hot jet of gas or air, which is directed at high speed onto the structured surface of the basic mold at temperatures of between 400 and 3000° C., are deposition processes which are suitable for this purpose.

The material which is deposited on the surface of the basic mold in droplet form cools on the surface and solidifies in the form of a layer which covers the structured surface in sheet-like form. Any desired layer thicknesses can be produced, depending on the deposition time.

Of course, it is possible for the deposition process to be carried out using different materials, i.e. the carrier layer which can be produced in this way can have a type of sandwich structure, with a layer sequence comprising different material compositions or material qualities with regard to porosity or brittleness.

After completion of the deposition of material on the structured surface of the basic mold and cooling of the deposited layer of material, this layer is separated from the basic mold and is then already in the form of the spatially shaped carrier layer which is of foil-like design. To make it easier to separate the carrier layer from the surface of the basic mold, a suitable separating layer may be provided between the surface of the basic mold and the carrier layer. It is also possible for the deposition parameters for the coating operation to be selected in such a manner that a first layer of the material which is deposited has only a low level of bonding to the surface of the basic mold.

Depending on the spatial configuration of the surface of the basic mold, it is possible to produce carrier layers of foil-like design from hard brittle material, preferably MCrAlY, which are of virtually any desired shape.

Production of a three-dimensional honeycomb structure requires a basic mold whose surface corresponds to the surface contour of a symmetrically halved honeycomb structure. A three-dimensional honeycomb structure of virtually any desired size can be produced by joining together two carrier layers which have been shaped in this way or a multiplicity of carrier layers which have been identically shaped in this way. The respective carrier layers, which are in the form of half of a honeycomb structure, are preferably joined to one another by means of spot welding or by means of suitable soldering techniques.

As an alternative to the above-described deposition process by means of flame spraying or thermal spraying or air spraying, deposition of material by means of electrodeposition within an electrodeposition bath using material-specific electrodes is also possible, allowing targeted deposition of material on the basic mold.

Furthermore, the sintering technique or what is known as braze coating can be used to produce the desired carrier layer, as a result of MCrAlY in powder form, mixed with a binder, being applied to the basic mold, and this coating then being sintered or fused in one or more furnace processes to form a spatially shaped carrier layer.

Finally, the technique known as melt spinning, which is known per se, also makes it possible to produce the above-described carrier layer from hard brittle material. In this case the hard brittle material is liquefied and is applied to a rotating, cooled structured roller, which cools and solidifies the liquefied material when it comes into contact with the roller surface, in the form of a liquid jet of material which is widened in sheet-like form by means of a suitably designed discharge nozzle. Rotation of the structured roller causes the cooled material, which has solidified to form a layer, to peel off the surface of the structured roller and form the desired carrier layer. The process allows continuous production of the carrier layer as yard ware. The shaping provided by the structured roller causes the carrier layer to be shaped automatically. To stick with the example of the production of a honeycomb structure, for this purpose the surface of the structured roller is shaped as half a honeycomb structure.

BRIEF DESCRIPTION OF THE DRAWINGS

The invention is described below by way of example, without restricting the general inventive idea, on the basis of exemplary embodiments and with reference to the drawings, in which.

DETAILED DESCRIPTION OF THE EXEMPLARY EMBODIMENTS

Figure 1:
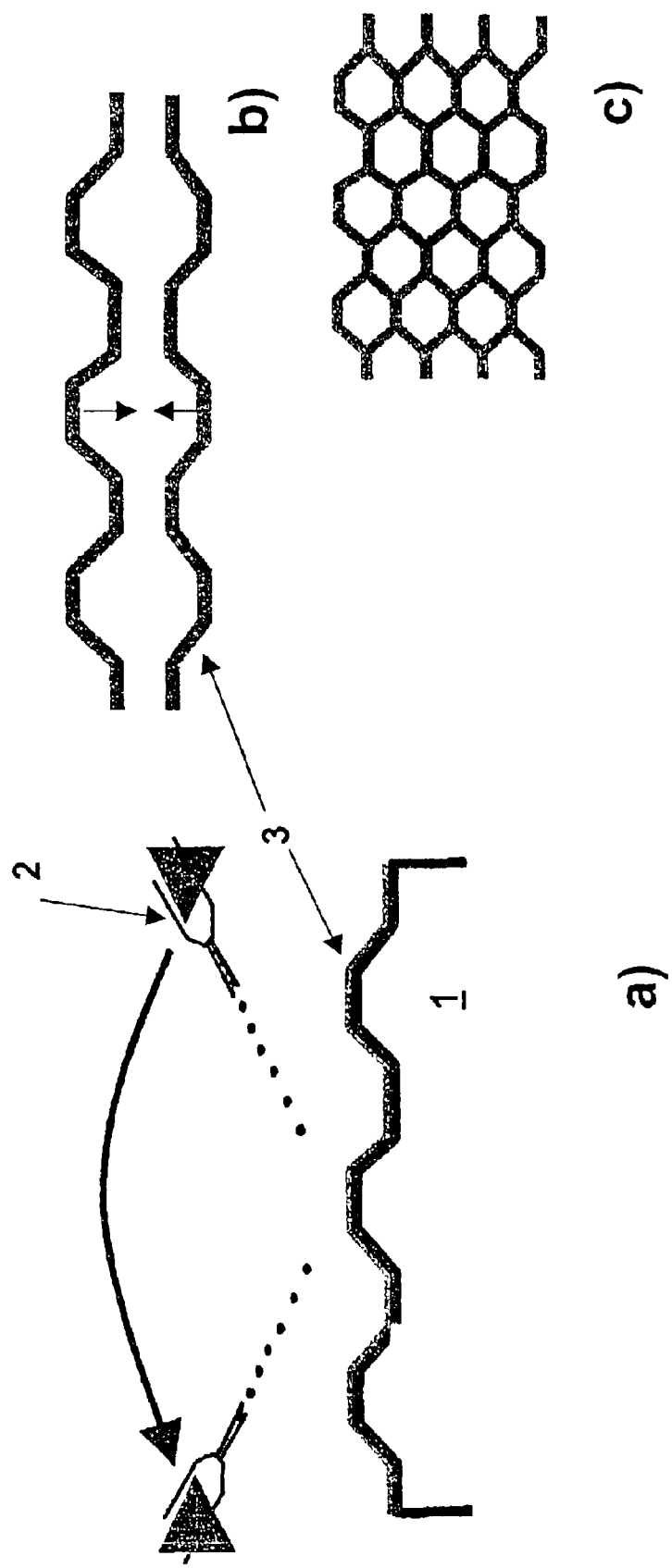
FIGS. 1a–c shows a diagrammatic illustration of the production of the carrier layer by means of flame or air spraying.
Figure 2:
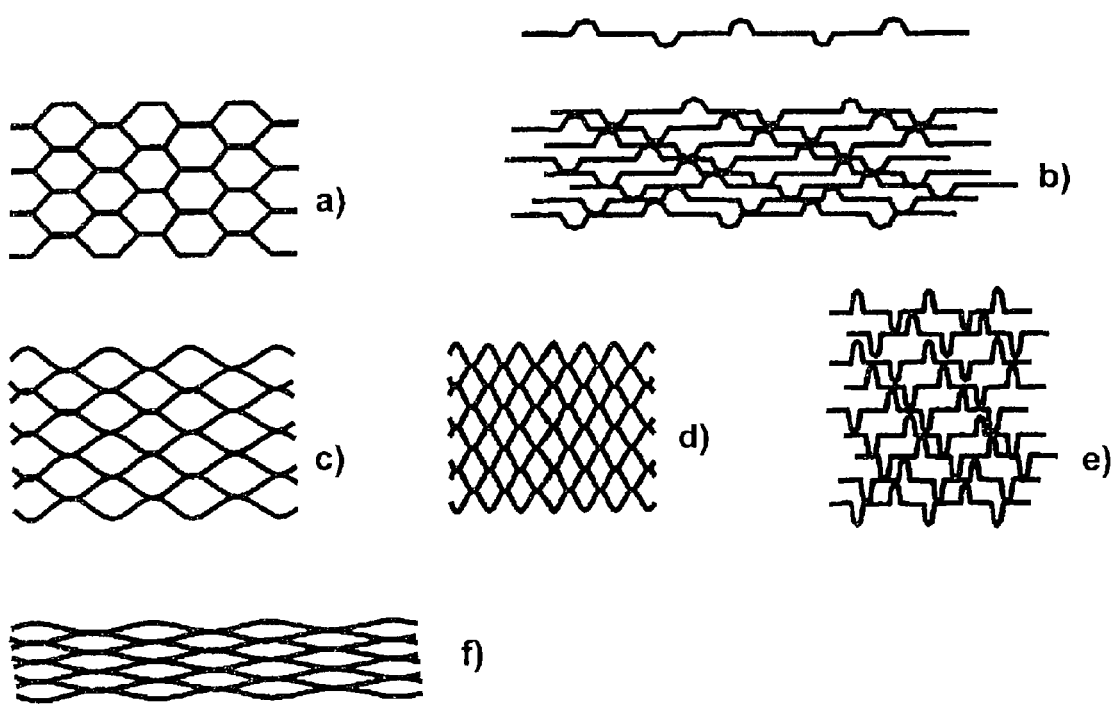
FIGS. 2a–f show exemplary embodiments of carrier layers in a three-dimensional structural assembly.

To produce a honeycomb structure, as shown in FIG. 1a a basic mold 1 is provided, the structured surface of which is in the form of half a honeycomb structure, and a subsequent coating operation takes place on this structured surface. A typical surface size of the basic mold 1 is, for example, 500×500 mm, and the surface is coated, for example, by means of flame spraying under a shielding gas atmosphere. Oxidation-resistant MCrAlY, such as SV20 or SV34, is preferably selected as material for coating, and is in powder form, is melted and, together with a hot gas or air jet, is directed in droplet form onto the surface of the basic mold 1 at temperatures of between 400° C. and 3000° C. by means of a discharge nozzle 2. The material is deposited in the form of a layer 3 which covers the surface of the basic mold 1.

The choice of the coating parameters, such as application rate, jet temperature, droplet size, etc., allows the consistency of the layer 3 which forms on the surface of the basic mold to be set individually. The parameters of the coating operation are preferably selected in such a manner that a first layer of the coating material which has a low level of bonding to the surface of the basic mold 1 is deposited. The further layers are preferably sprayed in different consistencies with regard to porosity, state of oxidation, etc. Depending on the coating parameters, it is possible to produce carrier layers with virtually any desired powder or layer grain size and structure. The choice of layer porosity is of crucial importance in particular when the carrier layer is subsequently used as a wearing element on the cover strip of a gas turbine blade or vane, especially since controlled wearing of the carrier layer used as sealing element is desired. In this context, carrier layers in which the individual powder particles do not form an excessively strong metallurgical bond within the carrier layer, on account of slight prior oxidation, are most suitable. As a result, during corresponding wear tests, wearing from the carrier layer can take place particle by particle.

Depending on the coating time, it is possible to establish virtually any desired layer thickness of the carrier layer 3 which is deposited on the basic mold 1. To make the layer thickness as homogeneous as possible with respect to the entire surface of the structured basic mold 1, the spraying device 2 is to be pivoted uniformly over the entire surface of the basic mold 1 (cf. arrow illustration in FIG. 1a).

After suitable cooling of the carrier layer which has been deposited, the latter is separated from the surface of the basic mold 1. The separation operation can be made easier, for example by providing a corresponding separation layer between the carrier layer and the surface of the basic mold. The carrier layer can be divided into suitable dimensions for further processing to form a three-dimensional honeycomb structure by means of suitable cutting techniques, for example by means of laser, water jet, erosion, electron beam, shearing, etc.

Then, a multiplicity of the carrier layers which have been described above are joined together in the manner shown in FIG. 1b and are fixed to one another at their contact surfaces by means of spot welding or soldering processes. This operation is repeated a suitable number of times to obtain a three-dimensional honeycomb structure, the cross section of which is likewise illustrated in FIG. 1c.

To produce the wearing elements for fitting to gas turbine blade or vane cover plates which were referred to in the introduction, by way of example a multiplicity of structured carrier layer strips with dimensions of 12×50 mm are cut out of the carrier layer (12 mm corresponds to the subsequent height of the honeycomb structure). The strips are arranged offset in a standing position next to one another until a width of 50 mm is also formed. After they have been fixed to one another in a suitable way by means of spot welding, the result is a wearing element which is suitable for use in gas turbines.

Despite the brittleness which is inherent to the material used, it has been found that the spot-welding technique for joining adjacent structured carrier layers does not have any adverse effect on the individual carrier layers.

It was possible for a honeycomb structure produced as described above to be used successfully as a wearing and sealing element within a gas turbine at temperatures of 1100° C. over 1000 operating hours without visible damage. At such high temperatures, all conventional materials which have hitherto been used and can be processed using the conventional machining methods mentioned in the introduction are fully oxidized and are no longer capable of functioning.

FIGS. 2a to f show cross sections through different three-dimensional layer structures which are obtained by corresponding shaping of the surface of the basic mold. The choice of cross-sectional variants shown in FIGS. 2a to f is not definitive and presents the possibility of producing carrier-layer combinations which are distributed uniformly and nonuniformly in cross section.

Figure 3:
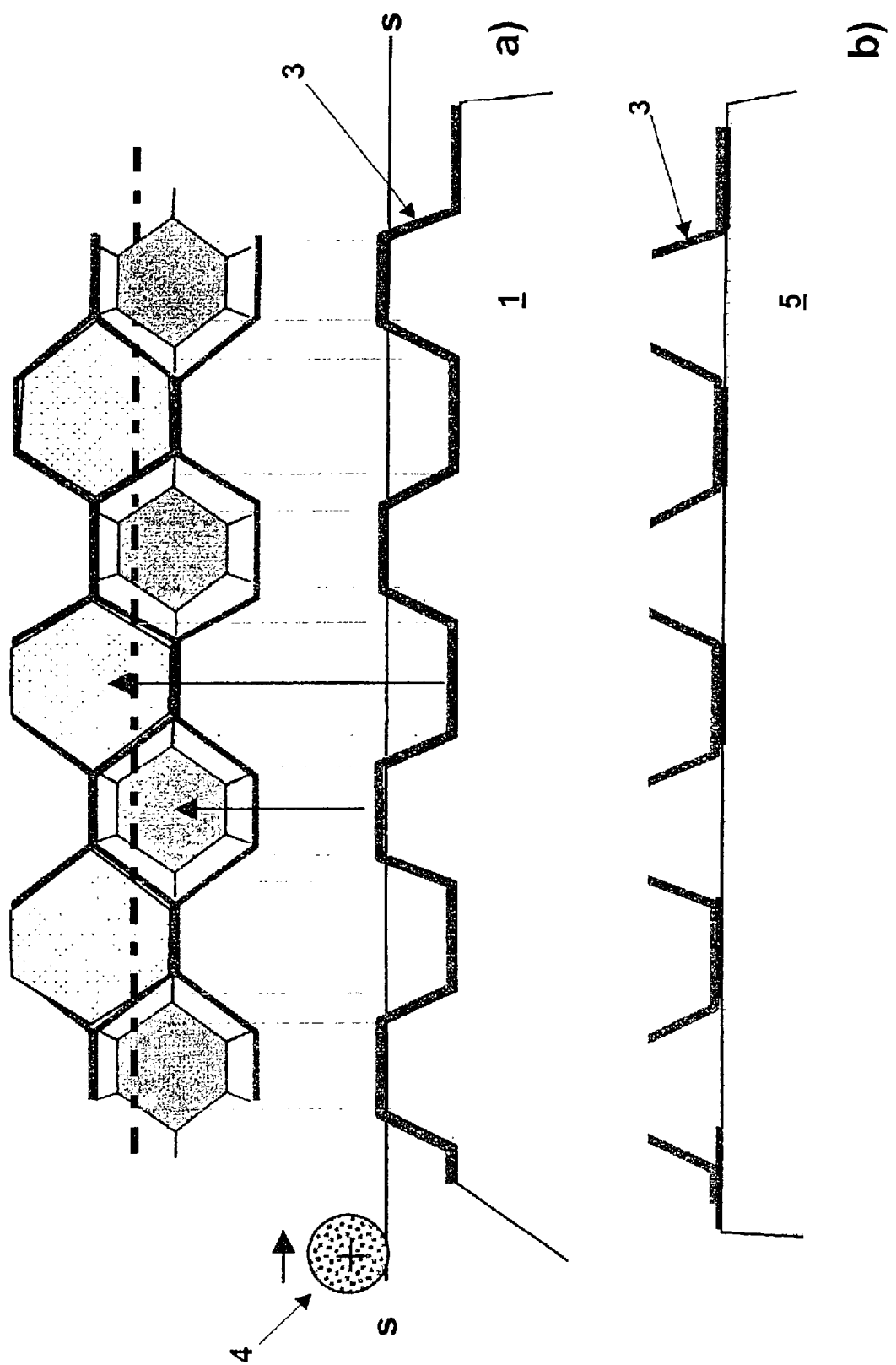
FIG. 3 shows a diagrammatic illustration of the production of a honeycomb structure arranged on a substrate.

FIG. 3a (lower part) shows a cross-sectional illustration of a carrier layer 3 which has already been deposited on a basic mold 1. The upper part of FIG. 3a shows a plan view of the carrier layer 3. In addition to the above-described deposition technique of flame spraying or air spraying, it is also possible for the carrier layer 3 to be applied to the structured surface of the basic mold 1 by means of electrodeposition. Sintering or braze coating, which will be dealt with in more detail below, are also recommended as alternative deposition techniques.

Even before the carrier layer 3 which has been deposited on the basic mold 1 is separated from the basic mold, in one variant embodiment of the process a grinding operation is provided, by means of which the upper, horizontally running layer sections of the carrier layer are separated (compare, in this respect FIG. 1a, lower part). This operation uses a milling head 4 which is passed over the carrier layer 3. The half honeycomb structures which are present are opened up on one side by the grinding or milling operation. The result of this is that, on joining to a carrier layer in half-honeycomb form, the two carrier layers are only joined to one another by means of a single-layer, common contact surface.

In FIG. 3b, a half-open carrier layer as explained above has been fixed to a substrate 5 by means of soldered joins 6. The substrate 5 may, for example, be the surface of a cover strip of a turbine blade or vane, to which a three-dimensional honeycomb structure (which is not shown in its entirety in FIG. 3b) is applied.

As has already been briefly pointed out above, there are alternative material deposition processes which allow MCrAlY material to be deposited on a structured surface of a basic mold.

In the case of electrodeposition, the structured surface of the basic mold 1 is introduced as cathode into an electrodeposition bath. Plates comprising changing materials, for example in the order nickel, chromium, aluminum, yttrium, nickel, are used as anode. With suitable current densities and times, the result is a layer sequence, the percentage composition of which corresponds to the desired MCrAlY alloy. A subsequent diffusion heat treatment leads to homogeneous mixing of the elements. A diffusion barrier which has previously been applied to the structured surface of the basic mold prevents this surface from sintering on during the electrodeposition operation.

Figure 4:
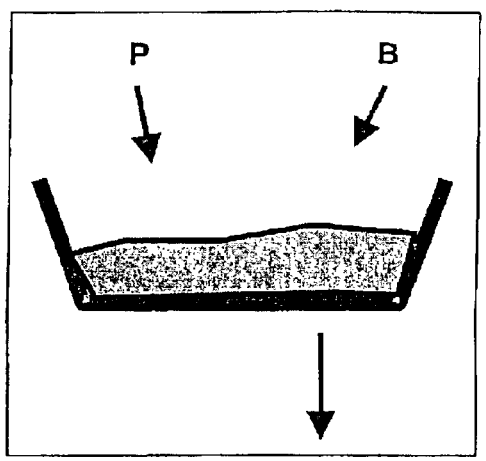
FIGS. 4a–d show steps involved in the production of a carrier layer by means of sintering technology.
Figure 4:
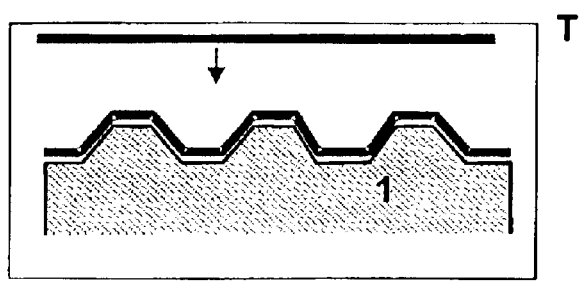
Figure 4:
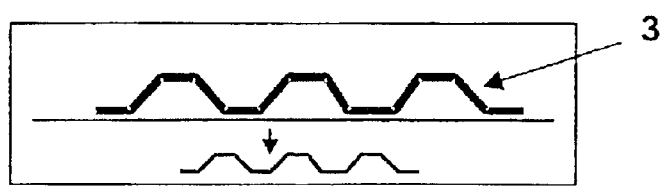
Figure 4:
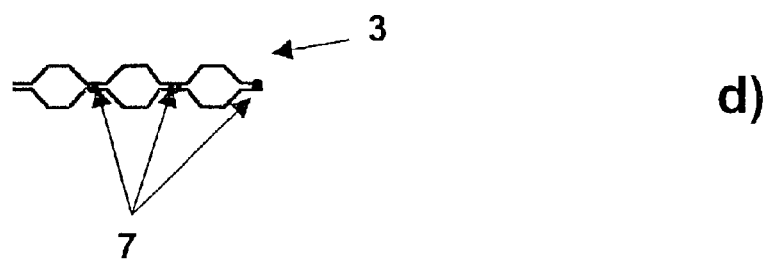

The sintering technique also makes it possible to produce the desired carrier layer. In FIG. 4a, MCrAlY powder P is mixed with a binder B and shaped into a flat strip T, for example with a thickness of 0.5 mm and a width of 18 mm, known as "tape" (FIG. 4b). This tape T is easy to handle and can be moved onto the surface of the basic mold 1 and adopt the precise shape thereof, for example a half honeycomb shape, by being pressed onto it. This is followed by preliminary sintering in suitable furnaces and thermal cycles, as is known to the person skilled in the art. This results in an initial metallurgical bonding between the powder grains without significant shrinkage of the shaped tape T. The binder is discharged in the form of a gas. Then, the pre-sintered compact is fully sintered, i.e. sintered until it is dense, on a base. In the process, the volume of the part shrinks by approximately 30–35% (FIG. 4c). The carrier layer 3 is then ready for further processing, for example two carrier layers 3 are spot-welded together (FIG. 4d).

Finally, braze coating represents a further alternative for the production of the carrier layer. In this case, MCrAlY powder is mixed with a small amount of binder and placed onto the basic mold. It is particularly advantageous if a nonstick layer, e.g. an oxidized surface or a ceramic layer, is applied evenly between the surface of the basic mold and the MCrAlY powder with added binder. Then, the basic mold, together with the layer which has been applied to it, is introduced into a suitable furnace which is at a temperature between the liquidus and solidus of the MCrAlY powder. The powder layer melts/sinters together and forms a uniform layer thickness and cools to form the carrier layer, which can then be joined in the manner which has already been described.

In addition to the abovementioned use of a three-dimensional honeycomb structure, which is produced using the process techniques described above, as a wearing element between the cover strip of a rotor blade and the stator housing of a gas turbine, in order to reduce the size of the leakage gap, structures of this type can also be used as heatshields or as sound-absorbing elements in turbine engineering. In the latter application, the three-dimensional structures are arranged in the outlet duct of turbines, in particular of jet engine turbines, in order, as acoustically active structures, to make a considerable contribution to reducing noise levels.

List of Reference Symbols

1 Basic mold
2 Application nozzle
3 Carrier layer
4 Milling head
5 Substrate
6 Soldered join

What is claimed is:

1. A process for producing a spatially shaped carrier layer from hard brittle material, comprising:

providing a basic mold having a spatially shaped surface;

depositing a material which is in the gas or liquid phase on the spatially shaped surface;

solidifying the material which has been deposited on the spatially shaped surface to form a hard brittle material layer; and separating the hard brittle material layer from the spatially shaped surface to obtain the carrier layer of hard brittle material;

wherein depositing the material comprises depositing liquid phase material on the surface of the basic mold by melt spinning, wherein the basic mold comprises a rotating structured roller, and comprising applying the liquefied material to a cooled surface of the structured roller through a discharge nozzle in the form of a widened let sheet of material, the liquefied material cooling and solidifying and being peeled off the structured roller as a result of the rotation of the structured roller in the form of a solidified, structured carrier layer.

2. The process as claimed in claim 1, wherein the hard brittle material comprises MCrAlY.

3. The process as claimed in claim 1, wherein the spatially shaped surface has a multiplicity of spatially periodically recurring elevations and/or depressions which are of identical design.

4. The process as claimed in claim 3, wherein the elevations or depressions are in each case in the form of a half of a honeycomb structure.

5. The process as claimed in claim 1, wherein at least two carrier layers, which comprises hard brittle material, are joined to one another as a sheet to form a three-dimensional structure comprising hard brittle material.

6. The process as claimed in claim 5, wherein at least two carrier layers, which comprise hard brittle material and are in each case in the form of halves of a honeycomb structure, are joined together to form a spatial honeycomb structure.

7. The process as claimed in claim 5, wherein joining of the at least two carrier layers comprises soldering or welding.

* * * * *